Patented Apr. 23, 1940

2,198,260

UNITED STATES PATENT OFFICE 2,198,260

PROCESS FOR THE PRODUCTION OF NITROGEN-CONTAINING ALPHA BETA-UNSATURATED KETONES

Johannes Andreas van Melsen, Amsterdam, Netherlands, assignor to Shell Development Company, San Francisco, Calif., a corporation of Delaware No Drawing. Application July 1, 1938, Serial No. 216,965. In the Netherlands July 9, 1937

11 Claims. (Cl. 260—584)

The present invention relates to a new and improved process for the production of nitrogen-containing alpha beta-unsaturated ketones having a nitrogen atom attached to the beta-unsaturated carbon atom. More particularly, the invention relates to a new and improved process for the production of amino-methylene ketones and their N-substituted derivatives.

The products prepared according to the process of the present invention constitute the group of compounds corresponding to the general formula

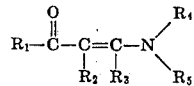

wherein $R_1$ represents a radical of the group consisting of aliphatic, cycloparaffinic, aryl, alkaryl and aralkyl radicals and $R_2$, $R_3$, $R_4$, and $R_5$ represent the same or different substituents of the group consisting of the hydrogen atom and aliphatic, cycloparaffinic, aryl, alkaryl, and aralkyl radicals. These compounds, as can be seen from the above formula, contain the characteristic conjugated structural grouping

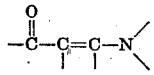

The compounds of the above general formula possess a strong tendency to tautomerize to compounds possessing the grouping

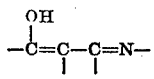

containing an acid acting enol group. This acid enol group, as will be shown later, is especially desirable in these compounds.

Nitrogen-containing alpha beta-unsaturated ketones of the above general formula have previously been prepared by reacting the sodium compound of a beta-hydroxy alpha beta-unsaturated ketone with a salt of a nitrogen base, such as ammonia, a primary amine, etc., the reaction being

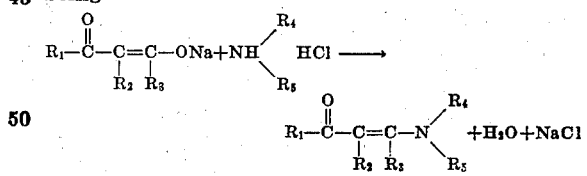

This process has the disadvantage of requiring the use of the hazardous alkali metals and of proceeding slowly with poor yields when applied to all but the most simple of these compounds. In the preparation of many of the higher homologues, it is possible to react the beta-hydroxy alpha beta-unsaturated ketone directly with the nitrogen base according to the reaction

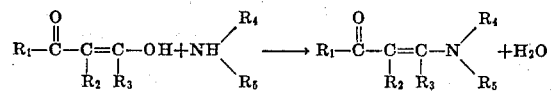

This process, while suitable in many cases, requires the isolation of the hydroxy compounds which, especially in the case of the lower members, are very unstable.

I have found that compounds of the above general formula may be more cheaply and easily prepared by reacting a nitrogen base, such as ammonia, a primary amine, etc., with a mono beta-halo alpha beta-unsaturated ketone. The reaction may be represented by the general equation

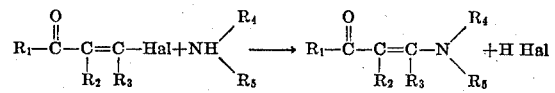

In general, any nitrogen base containing at least one nitrogen-bound amino hydrogen atom may be used. Thus, I may use ammonia, a primary amino-compound, or a secondary amino-compound. Examples of a few applicable nitrogen bases are ethanol amine, secondary-butyl amine, isobutylamine, tertiary-butyl amine, di-ethanolamine, di-propylamine, methyl benzylamine, ethylene diamine, asym. di-ethyl ethylene diamine, cyclohexylamine, di-cyclohexylamine, ethyl aniline, piperidine, allylamine, etc.

As suitable mono beta-halo alpha beta-unsaturated ketones I may use any of the compounds of the general formula

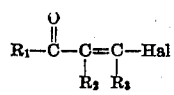

wherein $R_2$ and $R_3$ represent hydrogen atoms or the same or different radicals of the group consisting of aliphatic, cycloparaffinic, aryl, alkaryl, and aralkyl radicals and $R_1$ represents a radical of the above group. Examples of a few of the more useful groups occupying the positions of $R_1$, $R_2$, and $R_3$ are hydrogen atoms, (in the positions of $R_2$ and $R_3$ only) methyl, ethyl, propyl, isopropyl, normal-butyl, secondary butyl, isobutyl, tertiary butyl, amyl, cyclopentyl, cyclohexyl, cyclopentenyl, cyclohexadienyl, tertiary butyl phenyl, and allyl.

$R_1$ and $R_2$ may, moreover, be connected, for instance, through one or more methylene groups, in which case the carbonyl group becomes a member of a cyclic system. The mono beta-halo alpha beta-unsaturated ketones of this subgroup may be represented by the general formula

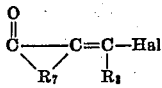

wherein $R_7$ represents $R_1$ and $R_2$ connected, and, as such, is a divalent open-chain hydrocarbon radical containing at least one methylene group. Examples of such structures are the following:

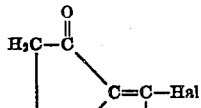

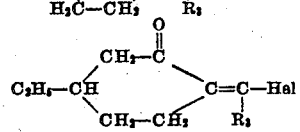

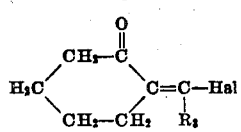

I have, moreover, found that nitrogen-containing alpha beta-unsaturated ketones of the above general formula may also be prepared in good yields by reacting any of the above-mentioned nitrogen bases with a compound of the general formula

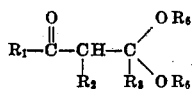

wherein $R_1$ $R_2$ and $R_3$ have the same significance as above and $OR_6$ represents the residue of an alcohol. As in the case of the mono beta-halo alpha beta-unsaturated ketones, $R_1$ and $R_2$ may be connected and together represent the radical $R_7$, in which case the acetal has the general formula

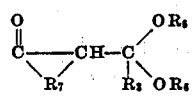

Although the present process is independent of the modes of preparing the reactants, one method of preparing these acetals which illustrates their close relation to the above described mono beta-halo alpha beta-unsaturated ketones, is through the following general reaction:

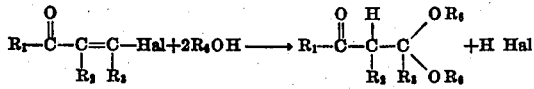

The reactions of the present process proceed at somewhat different rates depending upon the nature of the reactants, becoming somewhat slower as the molecular weight of the product increases. For the production of many of the lower homologues such as methylamino-methylene acetone ($CH_3$—$CO$—$CH$=$CH$—$NH$—$CH_3$) cooling to about 0° C. with ice may be desirable. In the production of higher homologues the reaction may be hastened by carrying out the reaction at a moderately elevated temperature, such as for instance from 30° to 100° C. In the majority of cases, however, the reaction may be conveniently carried out at about room temperature.

The reactions may, in general, be made to proceed smoother, especially if one of the reactants is normally a solid or viscous liquid, by carrying out the operation in the presence of an inert solvent of dispersing medium, such as a light petroleum fraction, an aromatic hydrocarbon, carbon tetrachloride, or the like. Any of the usual easily distillable inert solvents such as pentane, benzene, diethyl ether, etc., are applicable.

The reactants may be used in any relative amounts desired. In general, it is preferable to use approximately the stoichiometric quantities, or to use a slight excess of the least expensive reactant.

The nitrogen-containing alpha beta-unsaturated ketones of the present invention are very useful products. Aside from serving as intermediates in the production of numerous valuable chemicals, various members of this class of compounds and their direct derivatives may be used in pharmaceuticals, in special surface active agents, etc.

The preferred compounds of the present invention in which $R_4$ and $R_5$ in the above general formula are a hydrogen atom, i. e., those compounds produced through reaction with ammonia or a primary amino-compound, constitute an especially valuable class of compounds. Compounds of this class tend, in general, to tautomerize according to the equilibrium equation

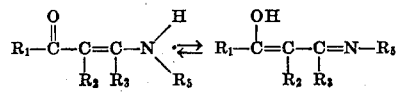

This is indicated, for example, by the ability of these compounds to color ferric chloride. Compounds of this class react with metals to give products which are valuable for improving the qualities of fuels and lubricants for internal combustion engines. Many of the present compounds and especially certain of their metal derivatives are toxic to various lower forms of life and are, therefore, useful for killing and controlling noxious organisms. As examples of these compounds, the following may be mentioned:

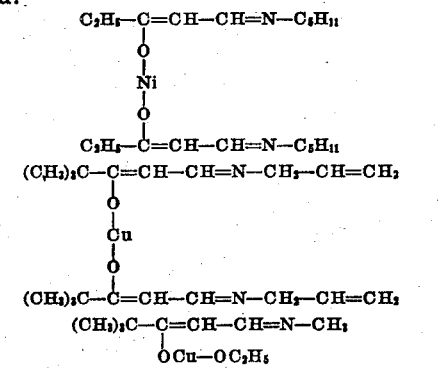

The various metal salts of the present compounds may be prepared more economically by utilizing the process of the present invention than by the conventional methods. In the conventional methods, a beta-hydroxy alpha beta-unsaturated ketone is reacted with a nitrogen base. The reaction product contains appreciable quantities of unreacted beta-hydroxy alpha beta-unsaturated ketone and since these compounds are also capable of reacting under the same condition to form metal salts, it is necessary to recover the desired reaction product in a pure form from the reaction mixture before reacting with the applied compound of the metal. The usual method of recovery consists in removing the insoluble salts formed, removing any solvent or diluent used and then subjecting the remainder to one or more fractional distillations in vacuo. The pure recovered reaction product is then dissolved in a suitable solvent and reacted with a suitable compound of the desired metal, whereupon the desired metal salt, being insoluble, is precipitated out.

If, according to the present process, a mono beta-halo alpha beta-unsaturated ketone or an acetal derived therefrom be reacted with a suitable nitrogen base the reaction product may be reacted directly, without intermediate vacuum distillation, to form the desired metal salts. This is possible by the present process since the mono beta-halo alpha beta-unsaturated ketones and acetals employed do not react under these conditions to form metal compounds which would contaminate the product.

The following examples, which are not to be construed as limitative, illustrate the preparation of a few of the present products according to the process of the invention:

Example I 21.8 gm. of allyl amine were added dropwise to a cooled solution of 20 gm. beta-chlorvinyl methyl ketone in 150 c.c. of absolute ether. The reaction took place readily with the separation of allyl ammonium chloride. After all the amine had been added the reaction mixture was allowed to stand for a few hours and then the allyl ammonium chloride was separated, the ether evaporated and the residue distilled in vacuo. The yield of allyl-amino methylene acetone (boiling point 103-103.5° C. at 17 mm. Hg) was 17 gm. or 71% of the theoretical.

Example II 7.8 gm. of technical amyl amine (boiling point 90-98° C.) were added dropwise to 11.8 gm. acetyl acetaldehyde dimethyl acetal while stirring. The reaction took place with the development of some heat. The reaction mixture was heated on a steam bath for an additional two hours and then distilled in vacuo. The yield of amyl-amino methylene acetone (boiling point 67-75° C. at 0.3 mm. Hg) was 9.1 gm. or 65% of the theoretical.

Example III

A solution of 4.3 gm. ammonia in 50 c. c. absolute alcohol was slowly added to 13.0 gm. of beta chlorvinyl methyl ketone. After a few moments standing the reaction set in with the development of heat and separation of ammonium chloride. The reaction mixture was allowed to stand for several hours to insure the completion of the reaction. After removing the precipitated ammonium chloride and evaporation of the alcohol, the product was distilled in vacuo. The yield of amino methylene acetone (boiling point 98-99° C. at 17 mm. Hg) was 5.3 gm. or 50% of the theoretical.

The term "aliphatic" as used in the appended claims to designate radicals which $R_1$, $R_2$, $R_3$, $R_4$, $R_5$ and $R_6$ in the structural formulae may represent is intended to embrace the cyclo-aliphatic as well as the open-chain aliphatic radicals.

I claim as my invention:

1. A process for the production of a nitrogen-containing alpha beta unsaturated ketone in which an amino nitrogen atom is attached to the unsaturated beta carbon atom which comprises reacting ammonia, in the presence of an inert solvent and at a temperature of from 0° C. to 100° C., with a mono beta-halo alpha beta-unsaturated ketone of the general formula

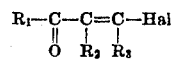

wherein $R_2$ and $R_3$ represent substituents of the group consisting of the hydrogen atom and the hydrocarbon radicals, and $R_1$ represents a hydrocarbon radical.

2. A process for the production of a nitrogen-containing alpha beta unsaturated ketone in which an amino nitrogen atom is attached to the unsaturated beta carbon atom which comprises reacting a compound of the general formula $R_4$—NH—$R_5$, wherein $R_4$ and $R_5$ represent substituents of the group consisting of the hydrogen atom and the hydrocarbon radicals, in the presence of an inert solvent and at a temperature of from 0° C. to 100° C., with a mono beta-halo alpha beta-unsaturated ketone of the general formula

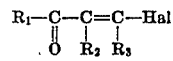

wherein $R_2$ and $R_3$ represent substituents of the group consisting of the hydrogen atom and the hydrocarbon radicals, and $R_1$ represents a hydrocarbon radical.

3. A process for the production of a nitrogen-containing alpha beta unsaturated ketone in which an amino nitrogen atom is attached to the unsaturated beta carbon atom which comprises reacting a compound of the general formula $R_4$—NH—$R_5$, wherein $R_4$ and $R_5$ represent substituents of the group consisting of the hydrogen atom and the hydrocarbon radicals, in the presence of an inert solvent, with a mono beta-halo alpha beta-unsaturated ketone of the general formula

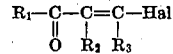

wherein $R_2$ and $R_3$ represent substituents of the group consisting of the hydrogen atom and the hydrocarbon radicals, and $R_1$ represents a hydrocarbon radical.

4. A process for the production of a nitrogen-containing alpha beta unsaturated ketone in which an amino nitrogen atom is attached to the unsaturated beta carbon atom which comprises reacting a compound of the general formula $R_5$—$NH_2$, wherein $R_5$ represents a hydrocarbon radical, in the presence of an inert solvent and at a temperature of from 0° C. to 100° C. with an acetal of the general formula

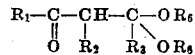

wherein $R_2$ and $R_3$ represent substituents of the group consisting of the hydrogen atom and the hydrocarbon radicals, $R_1$ represents a hydrocarbon radical, and $R_6$ represents an alkyl radical.

5. A process for the production of a nitrogen-containing alpha beta unsaturated ketone in which an amino nitrogen atom is attached to the unsaturated beta carbon atom which comprises reacting ammonia, in the presence of an inert solvent and at a temperature of from 0° C. to 100° C., with an acetal of the general formula

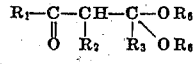

wherein $R_2$ and $R_3$ represent substituents of the group consisting of the hydrogen atom and the hydrocarbon radicals, $R_1$ represents a hydrocarbon radical, and $R_6$ represents an alkyl radical.

6. A process for the production of a nitrogen-containing alpha beta unsaturated ketone in which an amino nitrogen atom is attached to the unsaturated beta carbon atom which comprises reacting ammonia, at a temperature of from 0° C. to 100° C., with an acetal of the general formula

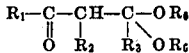

wherein $R_2$ and $R_3$ represent substituents of the group consisting of the hydrogen atom and the hydrocarbon radicals, $R_1$ represents a hydrocarbon radical, and $R_6$ represents an alkyl radical.

7. A process for the production of a nitrogen-containing alpha beta unsaturated ketone in which an amino nitrogen atom is attached to the unsaturated beta carbon atom which comprises reacting a compound of the general formula $R_4$—NH—$R_5$, wherein $R_4$ and $R_5$ represent substituents of the group consisting of the hydrogen atom and the hydrocarbon radicals, at a temperature of from 0° C. to 100° C., with a mono beta-chloro alpha beta-unsaturated ketone of the general formula

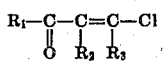

wherein $R_2$ and $R_3$ represent substituents of the group consisting of the hydrogen atom and the hydrocarbon radicals, and $R_1$ represents a hydrocarbon radical.

8. A process for the production of a nitrogen-containing alpha beta unsaturated ketone in which an amino nitrogen atom is attached to the unsaturated beta carbon atom which comprises reacting a compound of the general formula $R_4$—NH—$R_5$, wherein $R_4$ and $R_5$ represent substituents of the group consisting of the hydrogen atom and the hydrocarbon radicals, at a temperature of 0° C. to 100° C., with a compound selected from the group consisting of mono beta-halo alpha beta-unsaturated ketones of the general formulae

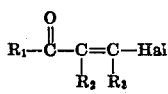

and

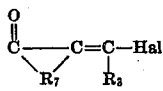

and the acetal reaction products of such ketones with aliphatic alcohols which acetals have the general formulae

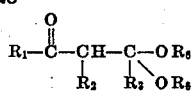

and

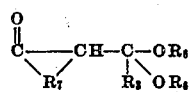

$R_2$ and $R_3$ in the formulae representing a substituent of the group consisting of the hydrogen atom and the hydrocarbon radicals, $R_1$ representing a hydrocarbon radical, $R_7$ representing a divalent open-chain hydrocarbon radical containing at least one methylene group, and $R_6$ representing an alkyl radical.

9. A process for the production of a nitrogen-containing alpha beta unsaturated ketone in which an amino nitrogen atom is attached to the unsaturated beta carbon atom which comprises reacting a compound of the general formula $R_4$—NH—$R_5$, wherein $R_4$ and $R_5$ represent substituents of the group consisting of the hydrogen atom and the hydrocarbon radicals, with a compound selected from the group consisting of mono beta-halo alpha beta-unsaturated ketones of the general formulae

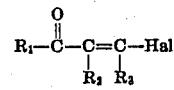

and

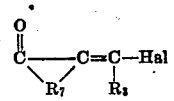

and the acetal reaction products of such ketones with aliphatic alcohols which acetals have the general formulae

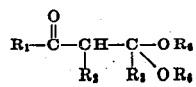

and

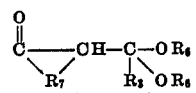

$R_2$ and $R_3$ in the formulae representing a substituent of the group consisting of the hydrogen atom and the hydrocarbon radicals, $R_1$ representing a hydrocarbon radical, $R_7$ representing a divalent open-chain hydrocarbon radical containing at least one methylene group, and $R_6$ representing an alkyl radical.

10. A process for the production of amino methylene acetone which comprises reacting beta chlorvinyl methyl ketone with ammonia at a temperature of from about 0° C. to about 100° C.

11. A process for the production of an amyl-amino methylene acetone which comprises reacting acetyl acetaldehyde dimethyl acetal with an amyl amine at a temperature of from about 0° C. to about 100° C.

JOHANNES ANDREAS VAN MELSEN.